United States Patent [19]

Takayanagi

[11] Patent Number: 5,422,732
[45] Date of Patent: Jun. 6, 1995

[54] FACSIMILE APPARATUS

[75] Inventor: Makoto Takayanagi, Shizuoka, Japan

[73] Assignee: TTT Corporation, Shizuka, Japan

[21] Appl. No.: 878,173

[22] Filed: May 4, 1992

[30] Foreign Application Priority Data

May 7, 1991 [JP] Japan .................................. 3-131756
May 7, 1991 [JP] Japan .................................. 3-131757
May 7, 1991 [JP] Japan .................................. 3-131758

[51] Int. Cl.6 ........................ G11B 21/02; H04N 1/23
[52] U.S. Cl. .................................. 358/296; 358/400; 360/105
[58] Field of Search .................. 358/400, 296; 346/76 PH, 134, 138; 360/104, 105, 109

[56] References Cited

U.S. PATENT DOCUMENTS 4,444,521 4/1984 Richard et al. .
4,559,571 12/1985 Olmsted et al. .
5,014,135 5/1991 Ijuin et al. ...................... 358/296

FOREIGN PATENT DOCUMENTS 62-126765 6/1987 Japan .
62-274973 11/1987 Japan .
63-40442 2/1988 Japan .
2-246470 10/1990 Japan .

Primary Examiner—Bentsu Ro
Attorney, Agent, or Firm—Ostrager, Chong & Flaherty

[57] ABSTRACT

A hollow platen roller common for reading and recording heads is provided. A cam shaft is disposed in the hollow platen roller and the cams are provided at the opposite ends of the hollow platen roller. The reading and recording heads are disposed in operation with the cam. Through the operation of the cam, the reading or recording head is selectively contacted with the outer surface of the hollow platen roller.

7 Claims, 5 Drawing Sheets

FIG. 4
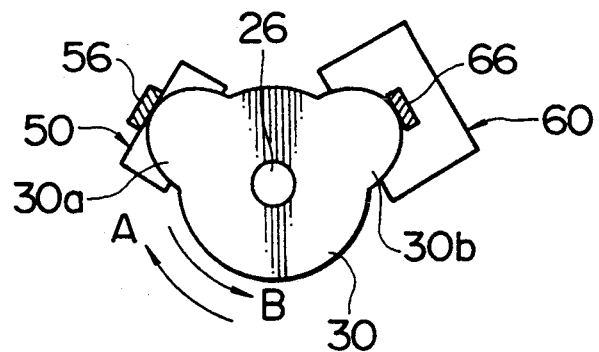
FIG. 5a
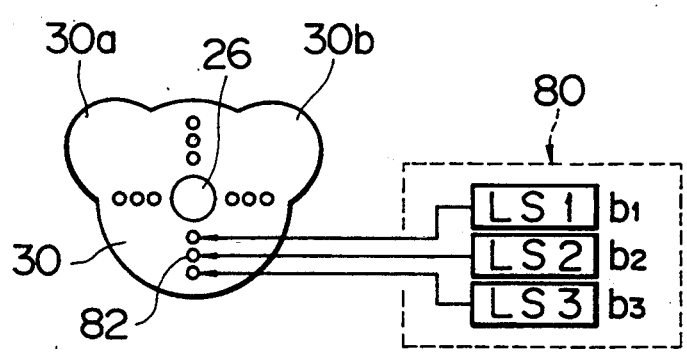
FIG. 5b  FIG. 5c  FIG. 5d  FIG. 5e
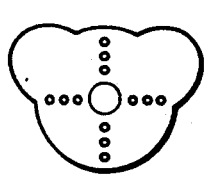 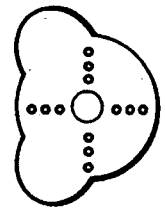 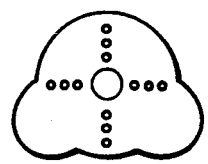 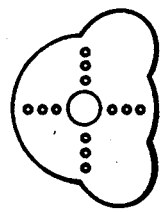

FACSIMILE APPARATUS

BACKGROUND OF THE INVENTION

This invention relates to facsimile apparatus, and more particularly it relates to a construction of a platen roller for facsimile apparatus which makes an entire construction of facsimile to be compact.

Furthermore, since it is preferred that the present invention is applied to the facsimile apparatus, the explanation hereinafter described is directed to a facsimile apparatus. However, the term "facsimile apparatus" herein is not limited to an apparatus which is usually called facsimile apparatus and includes other apparatus utilizing a reading head, a recording head or both reading and recording heads such as an image scanner, a printer, a copier and a PC modem, and further any combination thereof.

A facsimile apparatus comprises a transmitting section and a receiving section. The transmitting section usually comprises a reading head, a roller for holding a document between the reading head and the roller and being driven so as to transfer the document, motor and gears associated therewith for driving the roller, document guides, and the like. The receiving section usually comprises a recording head, a platen roller for holding the document between the recording head and the platen roller and being driven so as to transfer the document, and a motor and gears associated therewith for driving the platen roller, and the like.

As mentioned above, the facsimile apparatus is usually provided with two motors and two rollers. However, a facsimile apparatus utilizing only one motor for reading and recording in order to make the facsimile apparatus to be compact and light has been proposed. In such a case, an electromagnetic clutch, a oneway clutch or the like is used to switch over between reading operation and recording operation. Furthermore, in addition to application of one common motor, only one platen roller is used as a roller for transferring the document and a recording roller (see Japanese Laid-Open Publication No. 126765/1987). In the facsimile apparatus described in the publication, the switching over between the reading operation and the recording operation is made by driving a small motor to move a holder in a right and left direction through a rack and pinion, and thereby switching over between a pressure contact of a reading head on the platen roller and a pressure contact of a recording head on the platen roller. Moreover, such a system for switching over between pressure contacts of the reading and recording head on the platen roller has a disadvantage that a copying function cannot be performed.

Furthermore, although the apparatus utilizing one motor and one roller has been proposed, the switching over between reading and recording operations is made by a small motor, it substantially use two actuators in a sense. Thus, no apparatus utilizing one motor and one roller in order to be made compact and light has been proposed.

Furthermore, in the conventional apparatus, when the facsimile apparatus is in waiting or stand-by condition for transmitting or receiving, or in transportation, or in waiting condition for storage in wholehouse, the reading or recording head is in pressure contact with the roller (or platen roller). If such a waiting condition continues a long time, plastic deformation of rubber which the roller (platen roller) is made of is generated or rubber of the roller is sticked to the reading or recording head due to pressure contact, which results in non-rotation of the roller by the motor. To avoid this, in conventional apparatus, before the facsimile apparatus is shipped, a strip of paper or a wedge (spacer) of plastic is sandwiched between the roller and these heads to keep the heads spaced away from the roller. However, it effectively works only in the initial period.

Furthermore, conventional apparatus in which only one reversible motor common for the reading head and the recording head is used together with oneway clutch is proposed. In a system, the reading of data is made at the forward rotation of the motor while the recording of the data is made at the backward rotation of the motor, and the control of the system (the positioning of the reading and recording heads) is made by a manual crank. In another system, the treatment of data (the reading and recording of data) is made at the forward rotation of the motor while the control of the system is made by complicated link mechanism (see Japanese Laid-Open Publication No. 274973/1987).

SUMMARY OF THE INVENTION

It is, therefore, an object of the invention to provide a novel facsimile apparatus which uses one motor and one roller (a platen roller common for reading and recording) in order to be made compact and light.

More specifically, it is an object of the invention to provide a novel facsimile apparatus which is capable of being made compact and light by using a hollow platen roller.

It is another object of the invention to provide a facsimile apparatus which can be made compact and light and simultaneously can keep the heads spaced away from the roller so that it does not require the use of the strip of paper or the like and the plastic deformation or sticking is not generated.

It is still another object of the invention to provide a facsimile apparatus which can be made compact and light by adopting a hollow platen roller and simultaneously can make the data treatment and the control of the system.

These objects are accomplished by a facsimile apparatus which comprises a hollow platen roller, a cam shaft extending through said hollow platen roller and rotatably disposed, a cam attached to at least one end of said cam shaft outside of said hollow platen roller, a reading head and either one of recording head and recording paper holding-down means disposed so as to be selectively contacted with the outer surface of said hollow platen roller in accordance with the operation of said cam.

BRIEF DESCRIPTION OF THE DRAWINGS

The present invention will be now described in detail with reference to the preferred embodiments illustrated in the accompanying drawings in which:

FIG. 4 is a diagrammatic view for explanation on rotation of a hollow platen roller or rotation of a cam based on operation of the cam and direction of rotation of a motor, FIGS. 5a through 5e are diagrammatic views for explanation on positions of cam and selection of control mode.

DESCRIPTION OF THE PREFERRED EMBODIMENTS

Figure 1:
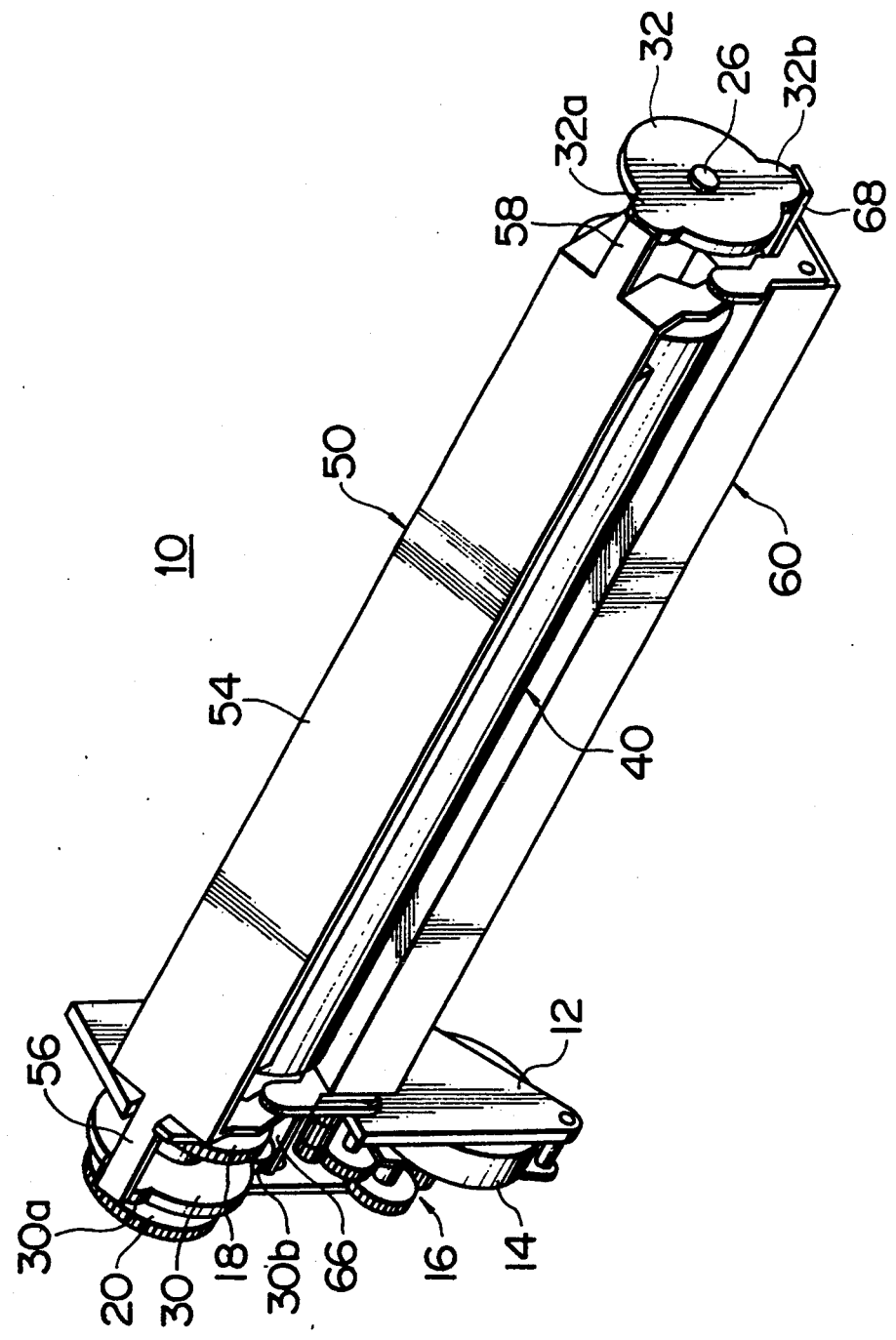
FIG. 1 is a perspective view showing a main portion of a facsimile apparatus according to present invention.
Figure 2:
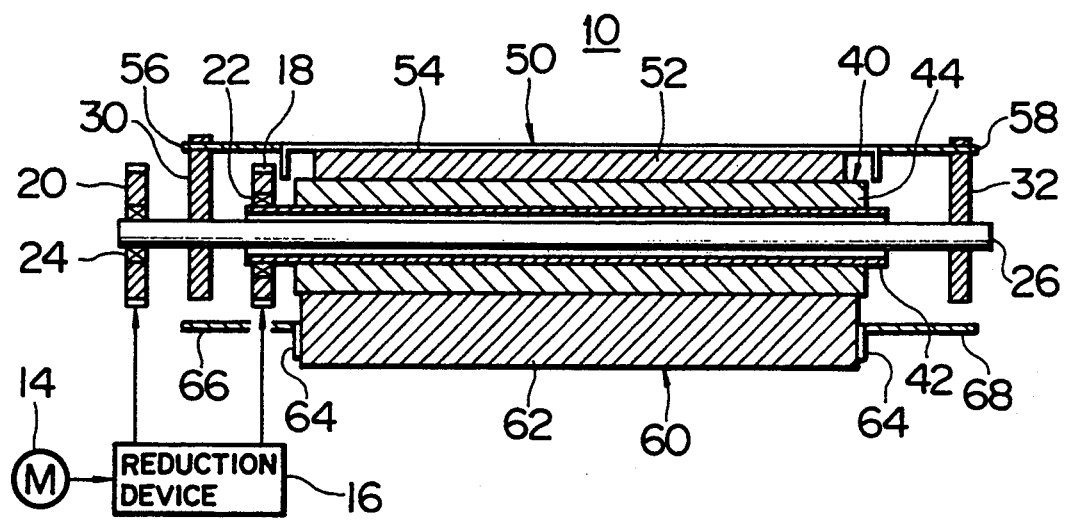
FIG. 2 is a schematically sectional view showing a facsimile apparatus.

Referring now to FIGS. 1 and 2, a facsimile apparatus 10 comprises a plate-like frame 12 which supports main components of the facsimile apparatus such as a motor 14, reduction device 16, a hollow platen roller 40, a reading head 60, a recording head 50 and the like. The motor 14 supported on the frame 12 is a reversible motor which can be selectively rotated forwardly and backwardly. The power is transmitted from the motor 14 through a reduction device 16 comprising a gear train to a gear 18 for driving the hollow platen roller 40, and simultaneously transmitted to a gear 20 for driving a cam shaft (see FIG. 2). Furthermore, it should be understood that the shown construction is a mere example and other constructions may be adopted. For example, the power is transmitted through the reduction device 16 to a common shaft, not shown, having two oneway clutches, not shown, and then the power is transmitted through that common shaft to the two oneway clutches, not shown.

The gear 18 is connected through a oneway clutch 22 to the hollow platen roller 40. When the motor 14 is forwardly rotated, the power is transmitted from the motor 14 to the hollow platen roller 40 to cause the hollow platen roller 40 to rotate forwardly. In the meanwhile, the gear 20 is connected through a oneway clutch 24 to the cam shaft 26, and thus when the motor backwardly rotated, the power is transmitted from the motor 14 to the cam shaft 26 to cause the cam shaft to rotate backwardly. As mentioned above, in accordance with the direction of the motor 14, either one of the hollow platen roller 14 and the cam shaft 26 is rotated.

Figure 3:
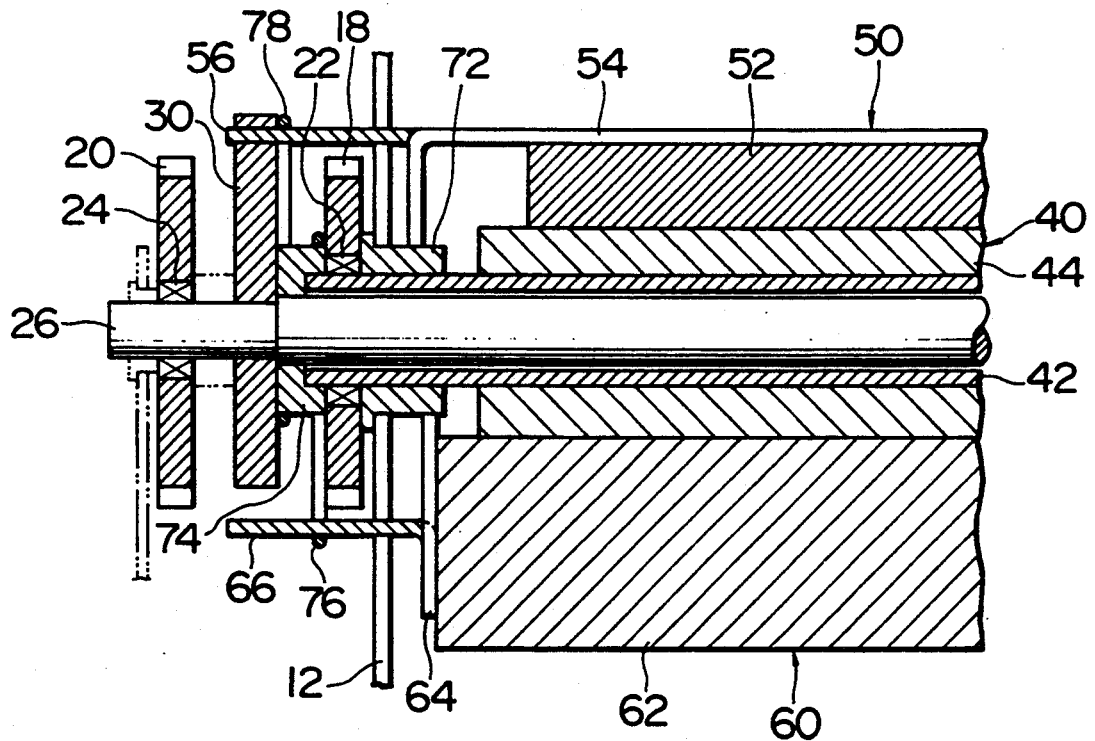
FIG. 3 is an enlarged sectional view showing a portion of the facsimile apparatus shown in FIG. 1.

Referring now to FIG. 3, the hollow platen roller 40 is tolerably supported through a flange bushing 72 on the frame 12, and comprises a rollor core metal 12 and a rubber roller 44 provided on the surface of the roller core metal 42. A recording head 50 and a reading-head 60 are attached to the hollow platen roller 40 through a bushing 72, and springs 78 and 76 for biasing both the heads 50 and 60 inwardly are disposed at the opposite ends of the hollow platen roller (only one of each spring 78 and spring 76 are shown in FIG. 3) so that these heads can be moved radially relative to the hollow platen roller 40.

The recording head 50 is normally pushed or biased inwardly by the spring 78 so that it is in pressure contact with the hollow platen roller 40, and comprises a recording head body 52 such as a thermal printing head and a plate 54 attached to the outer portion of the reading head body 52. The plate 54 has at its opposite ends portions 56 and 58 (see FIGS. 1 and 2) which constitutes cam followers in cammed relationship with cams 30 and 32, described in detail later.

In the meanwhile the reading head 60 is normally biased inwardly by the spring 76 so that it is in pressure contact with the hollow platen roller 40, and comprises a reading head 62 such as a contact image sensor and a plate (L-shaped flange) 64 attached to the outer portion of the reading head body 62. The plate 64 also has at its opposite ends portions 66 and 68 which constitute cam follows in cammed relationship with the cams 30 and 32 (see FIGS. 1 and 2), described in detail later.

The cams 30 and 32 are attached to the opposite ends of the cam shaft 26 which completely extends through the hollow platen roller 40. More specifically, the cam 30 is attached to the end of the cam shaft 26 between the gear 20 and the end of the hollow platen shaft while the cam 32 is attached to the end of the cam shaft 26 outwardly of the end of the hollow platen roller. The cams 30 and 32 are of such a shape that they are in the form of discs each of which having two arched portions 30a and 30b or 32a and 32b disposed apart from each other, for example, 120 degrees and projecting from the two circumferential portions of the discs (see FIGS. 1, 4 and 5).

With such a construction, when the cams 30 and 32 are rotated through the gear 20 and the oneway clutch 24 by the motor 11, the arched portions 30a and 32a and/or 30b and pushes outwardly the cam follow portions 56, 58 and 66, 68 of the recording head 50 and/or the reading head 60 against the action of the springs 76 and 78, and thereby causing the recording head 50 and/or the reading head 60 to move away from the hollow platen roller 40.

Referring now to FIG. 4, when the motor is rotated in a forward or clockwise direction as shown in an arrow "A", the power from the motor causes the hollow platen roller 40 to rotate forwardly or clockwisely through the oneway clutch 22, while the cam shaft is not rotated and is maintained in a stationary position since the cam shaft is connected through the other oneway clutch 24. On the contrary, when the motor is rotated in a backwardly or counter-clockwisely as shown in an arrow "B", the power from the motor is transmitted through the other oneway clutch 24 to the cam 30, and then the each portion 30a, 32a or 30b, 32b pushes outwardly the cam followers 56, 58 and/or 66, 68 of the recording head body 50 and/or reading head body 60 to move one or both of these heads away from the hollow platen roller.

Referring now to FIGS. 5a through 5e, the FIG. 5a shows the cam 30 and the group 80 of the limit switches. The group of limit switches comprises, for example, three switches LS1, LS2 and LS3, and the group 80 is in cooperation with one of four groups each comprisig three detents 82 (b1, b2, b3). A below table shows modes in accordance with ON and OFF conditions of these limit switches.

TABLE

|  | LS1 | LS2 | LS3 |
| --- | --- | --- | --- |
| Waiting mode (position 1) | OFF | OFF | ON |
| Trasmitting mode (position 2) | OFF | ON | OFF |
| Copy mode (position 3) | OFF | ON | ON |
| Receiving mode (position 4) | ON | OFF | OFF |

FIGS. 5b, 5c, 5d and 5e show various positions of the cams which are in the above mentioned modes. In the waiting mode, the recording head 50 and the reading head 60 are spaced away from the hollow platen roller. This mode is used when the facsimile is not used or is stored or in transportation. In the transmitting mode, only the reading head is in contact with the hollow platen roller. In the copy mode, both the recording head 50 and the reading head 60 are in contact with the hollow platen roller. In the receiving mode, only the recording head 50 is in contact with the hollow platen roller.

Figure 6:
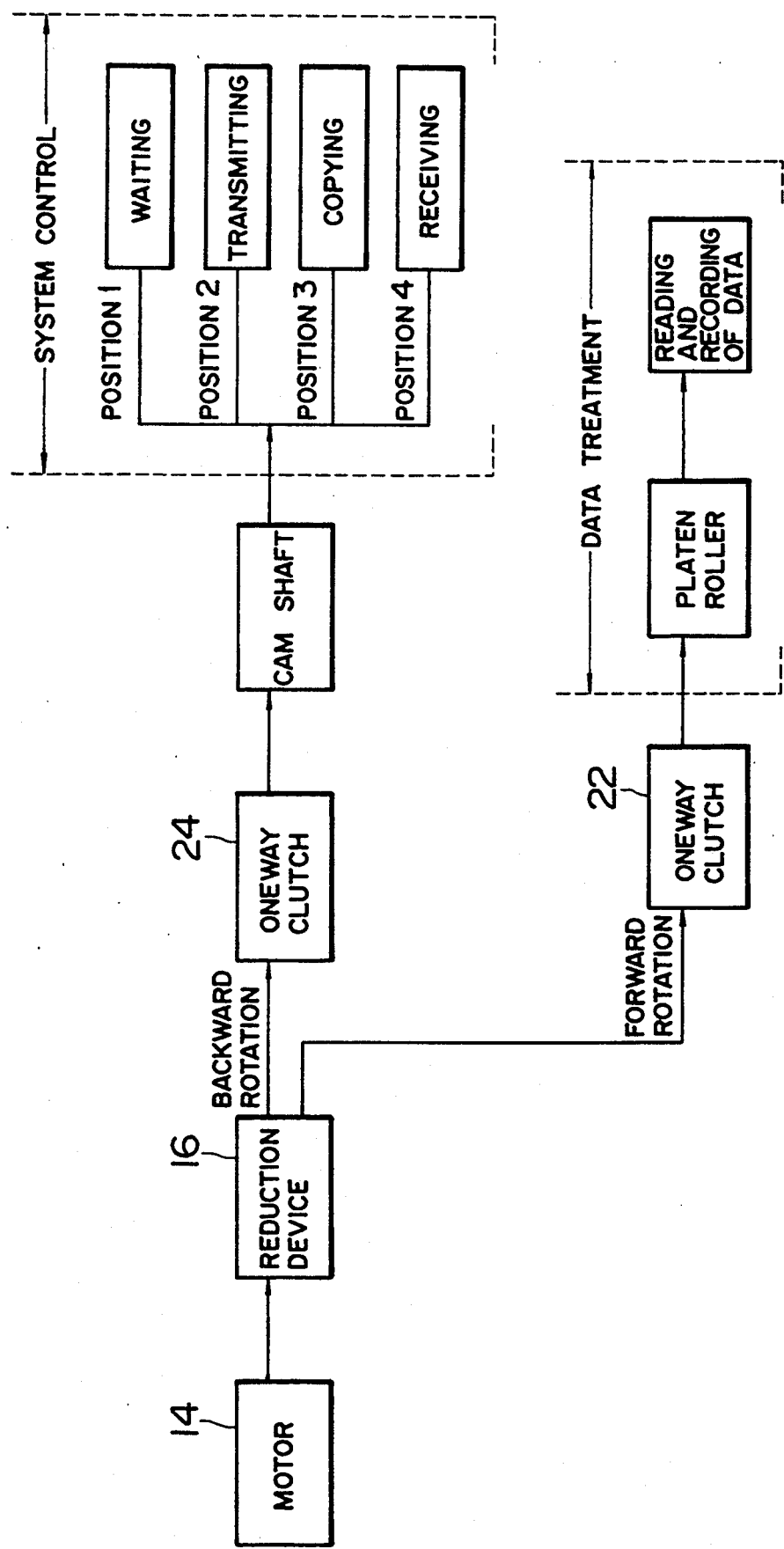
FIG. 6 is a diagrammatic view for explanation on the setting of mode and data treatment based on forward or backward rotation of motor.

Referring now to FIG. 6, explanation on the setting of mode and data treatment in accordance with forward and backward rotation of the motor will be made. Rotational driving force is simultaneously transmitted from the motor 14 through the reduction device 16 to both the oneway clutches 22 and 24. First, the motor is set so that it rotates backwardly and therefore the cam shaft is driven through the one oneway clutch 24 to select one of the positions of the cams based on the instruction and the group of the limit switches, and is stopped at the selected position. Thus, one of the control mode, for example, the transmitting mode is selected.

Next, the motor is set to rotate forwardly, and rotational driving of the motor causes the hollow platen roller to be driven through the other oneway clutch 22 to make the treatment of data.

Figure 7:
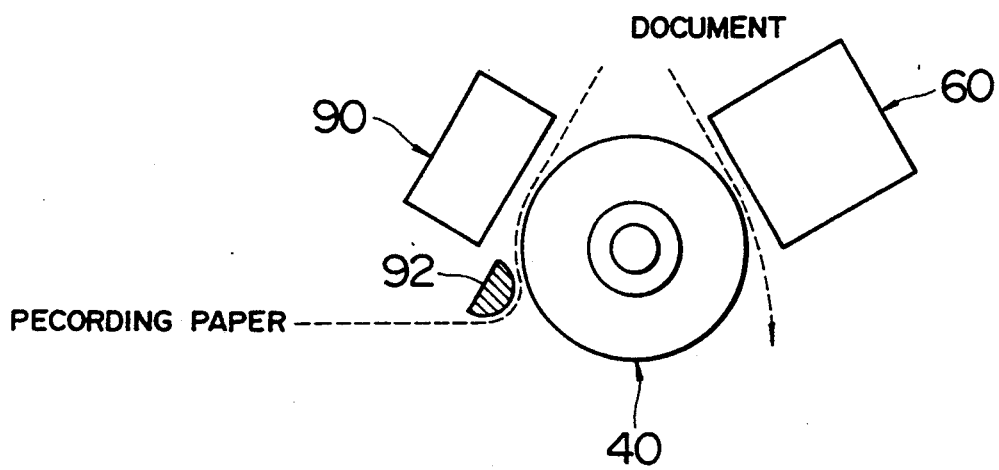
FIG. 7 is a diagrammatic side view showing another embodiment according to the present invention.

Referring now to FIG. 7, another embodiment of the present invention will be explained. In the embodiment, ink jet or wire dot type of recording head 90 is used to record or print with the head being spaced from the hollow platen roller, instead of the thermal printing head used in pressure contact with the hollow platen roller. In the case, the recording paper holding-down means 92 for holding down the recording paper on the hollow platen roller 40 is provided to move relative to the hollow platen roller. That is, the recording paper holding-down means 92 is constructed so that it takes various positions of the modes instead of the recording head 50.

Figure 8A:
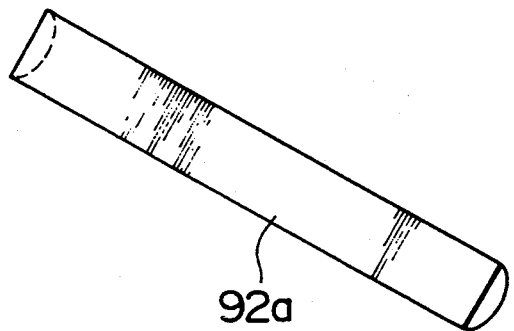
FIGS. 8a and 8b are diagrammatically perspective views showing a holder bar and a rubber roller, respectively.
Figure 8B:
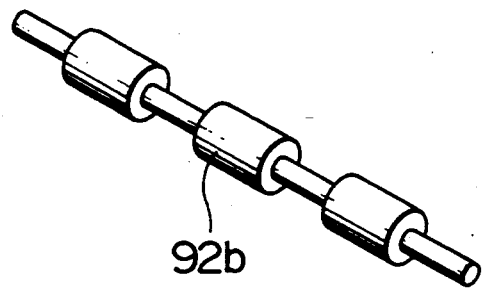

FIGS. 8a and 8b show the specific embodiments of the above mentioned recording paper holding-down means which may be a bar 92a having semicircle in section or roller 92b made of rubber or plastic.

What we claim:

1. A facsimile apparatus comprising:
    a hollow platen roller having an outer surface and inner walls defining a hollow space therein;
    a cam shaft extending through the hollow space in said hollow platen roller and mounted for rotation independent of said hollow platen roller;
    a cam attached to an end of said cam shaft extending outside one end of said hollow platen roller;
    a reading head and a recording means arranged in spaced apart relation from each other around the outer surface of said hollow platen roller, said recording means including a recording head add recording paper holding-down means associated therewith, said reading head and said recording means being selectively movable to positions spaced from and in contact with paper held on the outer surface of said hollow platen roller for reading and recording operations thereon,
    wherein said cam is coupled to said reading head and to said recording means and is operated to selectively move them into contact with paper on the outer surface of said hollow platen roller, and
    further wherein said cam is operable in a plurality of positions including a waiting position wherein said reading head and said recording means are spaced from the platen roller, a transmitting position wherein only said reading head is in contact with said platen roller and a receiving position wherein only said recording means is in contact with said platen roller.

2. A facsimile apparatus according to claim 1 in which said recording head is spaced from said hollow platen roller, and said recording paper holding-down means is disposed to be selectively contacted with the outer surface of said hollow platen roller.

3. A facsimile apparatus according to claim 1 in which said recording paper holding-down means comprises a holding-down bar or a holding-down roller.

4. A facsimile apparatus according to claim 1 in which said facsimile apparatus further takes a copying position wherein said reading head is in contact with said platen roller and one of either recording head and recording paper holding-down means is in contact with said platen roller.

5. A facsimile apparatus comprising:
    a hollow platen roller having an outer surface and inner walls defining a hollow space therein;
    a cam shaft extending through the hollow space in said hollow platen roller and mounted for rotation independent of said hollow platen roller;
    a cam attached to an end of said cam shaft extending outside one end of said hollow platen roller;
    a reading head and a recording means arranged in spaced apart relation from each other around the outer surface of said hollow platen roller, said recording means including a recording head and recording paper holding-down means associated therewith, said reading head and said recording means being selectively movable to positions spaced from and in contact with paper held on the outer surface of said hollow platen roller for reading and recording operations thereon,
    wherein said cam is coupled to said reading head and to said recording means and is operated to selectively move them into contact with paper on the outer surface of said hollow platen roller, and
    a reversible motor capable of being operated selectively in forward and backward rotation, and two one-way clutches coupling said motor to said platen roller and said cam for selectively transmitting power to either one of said platen roller and said cam in accordance with either one of forward and backward rotation of said motor.

6. A facsimile apparatus according to claim 5 in which said cam shaft is positioned in the hollow space and not in contact with the inner walls of said platen roller.

7. A facsimile apparatus according to claim 5 in which tension springs are coupled between said reading head and recording means and the end of said cam shaft for biasing said reading head and recording means into contact with said platen roller.

* * * * *

UNITED STATES PATENT AND TRADEMARK OFFICE
CERTIFICATE OF CORRECTION

PATENT NO. : 5,422,732
DATED : June 6, 1995
INVENTOR(S) : M. Takayanagi

It is certified that error appears in the above-identified patent and that said Letters Patent is hereby corrected as shown below:

On title page, item [73], change the Assignee name to:
--LAB. SHIN-EI Corporation--.

Signed and Sealed this

Eighth Day of October, 1996

Attest:

BRUCE LEHMAN

Attesting Officer     Commissioner of Patents and Trademarks